United States Patent
Horn

(10) Patent No.: US 9,637,232 B2
(45) Date of Patent: May 2, 2017

(54) DISTRIBUTED EXHAUST SYSTEM

(75) Inventor: Mark D. Horn, Granada Hills, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 972 days.

(21) Appl. No.: 13/169,337

(22) Filed: Jun. 27, 2011

(65) Prior Publication Data

US 2012/0325345 A1 Dec. 27, 2012

(51) Int. Cl.
 *F01N 3/02* (2006.01)
 *B64C 39/02* (2006.01)
 *B64D 33/04* (2006.01)
 *F01D 25/30* (2006.01)

(52) U.S. Cl.
 CPC ............ *B64C 39/024* (2013.01); *B64D 33/04* (2013.01); *F01D 25/30* (2013.01); *B64C 2201/021* (2013.01); *B64C 2201/044* (2013.01); *B64C 2201/162* (2013.01); *Y10T 137/85938* (2015.04)

(58) Field of Classification Search
 CPC ............ B64C 39/024; B64C 2201/021; B64C 2201/044; B64C 2201/162; B64D 33/04; F01D 25/30
 USPC .................. 60/316, 317, 319, 321, 323, 324
 See application file for complete search history.

(56) References Cited

U.S. PATENT DOCUMENTS

| | | | |
|---|---|---|---|
| 1,949,556 A * | 3/1934 | Woolson ..................... | 123/79 R |
| 2,112,534 A * | 3/1938 | Keen ..................... | F01N 13/082 |
| | | | 105/37 |
| 2,208,156 A * | 7/1940 | Gilbert ................... | B64D 35/04 |
| | | | 74/665 K |
| 2,297,425 A * | 9/1942 | Meissner ......................... | 60/225 |
| 2,409,446 A * | 10/1946 | Pavlecka ................. | B64C 11/48 |
| | | | 244/209 |
| 2,420,964 A * | 5/1947 | Salmon ................... | F01N 13/20 |
| | | | 123/41.31 |
| 2,603,433 A * | 7/1952 | Nosker ................... | F41G 7/008 |
| | | | 244/190 |
| 2,865,169 A * | 12/1958 | Hausmann ................ | F02K 1/42 |
| | | | 181/215 |
| 2,922,486 A * | 1/1960 | McRee et al. ................ | 181/238 |
| 3,497,031 A * | 2/1970 | Kedziora .................. | F01N 1/08 |
| | | | 181/240 |
| 3,583,630 A * | 6/1971 | Wilfert et al. ................ | 237/8 R |
| 3,650,348 A * | 3/1972 | Colebrook ................ | F02K 1/40 |
| | | | 181/215 |
| 3,866,586 A * | 2/1975 | Scott, Jr. .................. | 123/568.17 |
| 4,406,431 A * | 9/1983 | Heuberger .................. | 244/53 B |
| 4,826,410 A * | 5/1989 | Yamamoto et al. ........... | 418/84 |
| 5,109,668 A * | 5/1992 | Lindstedt ................ | F01N 3/046 |
| | | | 60/310 |
| 5,197,855 A * | 3/1993 | Magliozzi et al. ........... | 415/167 |

(Continued)

FOREIGN PATENT DOCUMENTS

| WO | 2010042692 | 4/2010 |
|---|---|---|
| WO | 2011043773 | 4/2011 |

*Primary Examiner* — Jason Shanske
*Assistant Examiner* — Matthew T Largi
(74) *Attorney, Agent, or Firm* — Carlson, Gaskey & Olds, P.C.

(57) ABSTRACT

An exhaust system includes a multiple of distribution risers which extend transverse to a plenum, each of the multiple of distribution risers includes at least one downstream directed aperture.

22 Claims, 8 Drawing Sheets

(56) References Cited

U.S. PATENT DOCUMENTS

| | | | | |
|---|---|---|---|---|
| 5,220,789 A * | 6/1993 | Riley | ............... | B60K 13/04 |
| | | | | 181/240 |
| 5,779,190 A * | 7/1998 | Rambo | ............ | B64C 39/024 |
| | | | | 244/118.2 |
| 6,032,459 A | 3/2000 | Skowronski | | |
| 7,703,573 B2 * | 4/2010 | Feight et al. | ............ | 181/239 |
| 8,215,096 B2 * | 7/2012 | Lundbladh | .......... | F02K 1/006 |
| | | | | 239/265.27 |
| 2005/0098143 A1 * | 5/2005 | Schwam | ........... | B64D 27/02 |
| | | | | 123/242 |
| 2006/0260562 A1 * | 11/2006 | Otterstrom et al. | .......... | 123/3 |
| 2007/0119157 A1 * | 5/2007 | Longdill et al. | ............ | 60/320 |
| 2008/0118347 A1 * | 5/2008 | Turner | ................ | F01D 25/30 |
| | | | | 415/119 |
| 2008/0141664 A1 * | 6/2008 | Bidner et al. | ............... | 60/320 |
| 2012/0298083 A1 * | 11/2012 | Howell et al. | ........... | 123/65 R |

* cited by examiner

DISTRIBUTED EXHAUST SYSTEM

BACKGROUND

The present disclosure relates to an exhaust system, and more particularly to a distributed exhaust system for a pusher prop aircraft.

An aircraft in a pusher configuration may provide increased efficiency as the propeller system re-energizes the boundary layer developed on the airframe and reduces form drag as flow remains attached. The engine exhaust of the pusher configuration, however, is necessarily exhausted through the propeller system and may adversely affect the propeller by causing unacceptable localized propeller heating.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
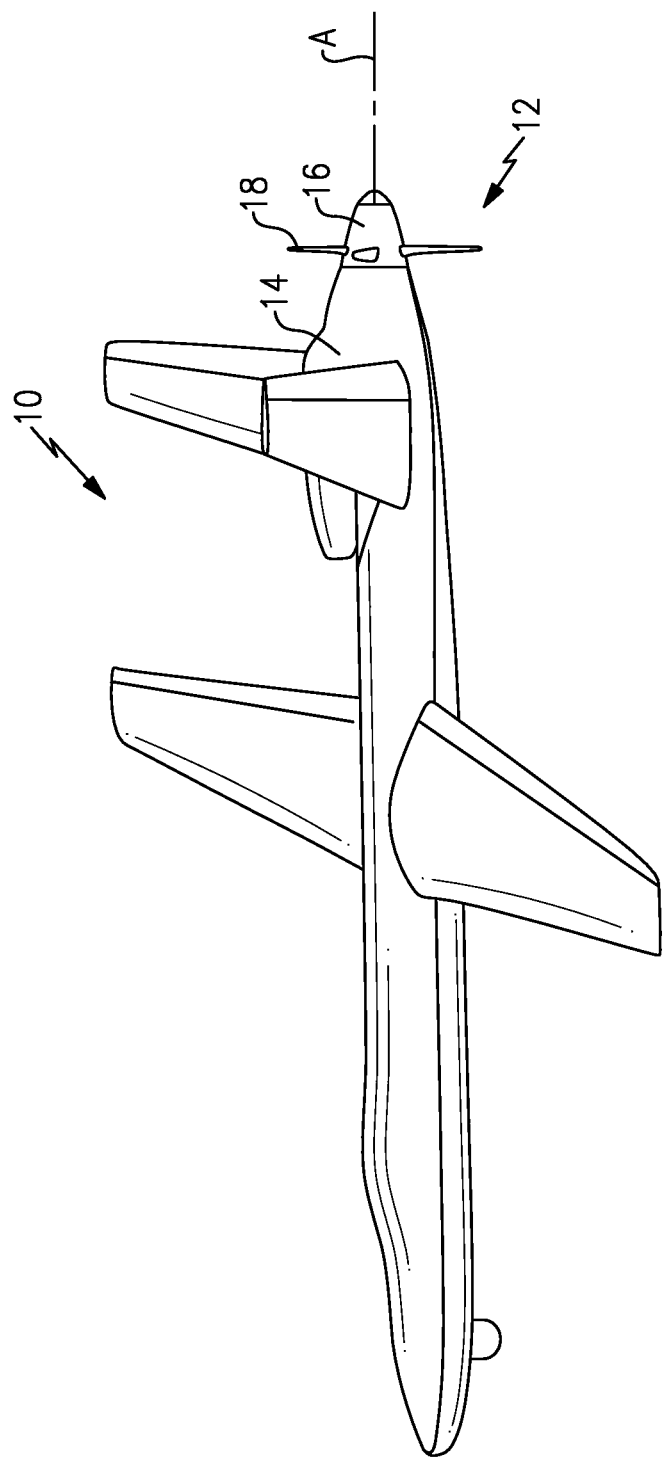
FIG. 1 is a general perspective view of an exemplary aircraft embodiment for use with the present disclosure.

FIG. 1 schematically illustrates an air vehicle 10 with a pusher prop propulsion system 12. The pusher prop propulsion system 12 generally includes an engine 14 which drives a rotor hub 16 with a multiple of prop blades 18 for rotation about an axis of rotation A. The rotor hub 16 may be driven directly by the engine 14 or through a geared architecture of various configurations. Although a propeller system typical of a fixed wing aircraft is illustrated in the disclosed non-limiting embodiment, it should be understood that various air vehicle, rotor blade and propeller system configurations will also benefit herefrom.

Figure 2:
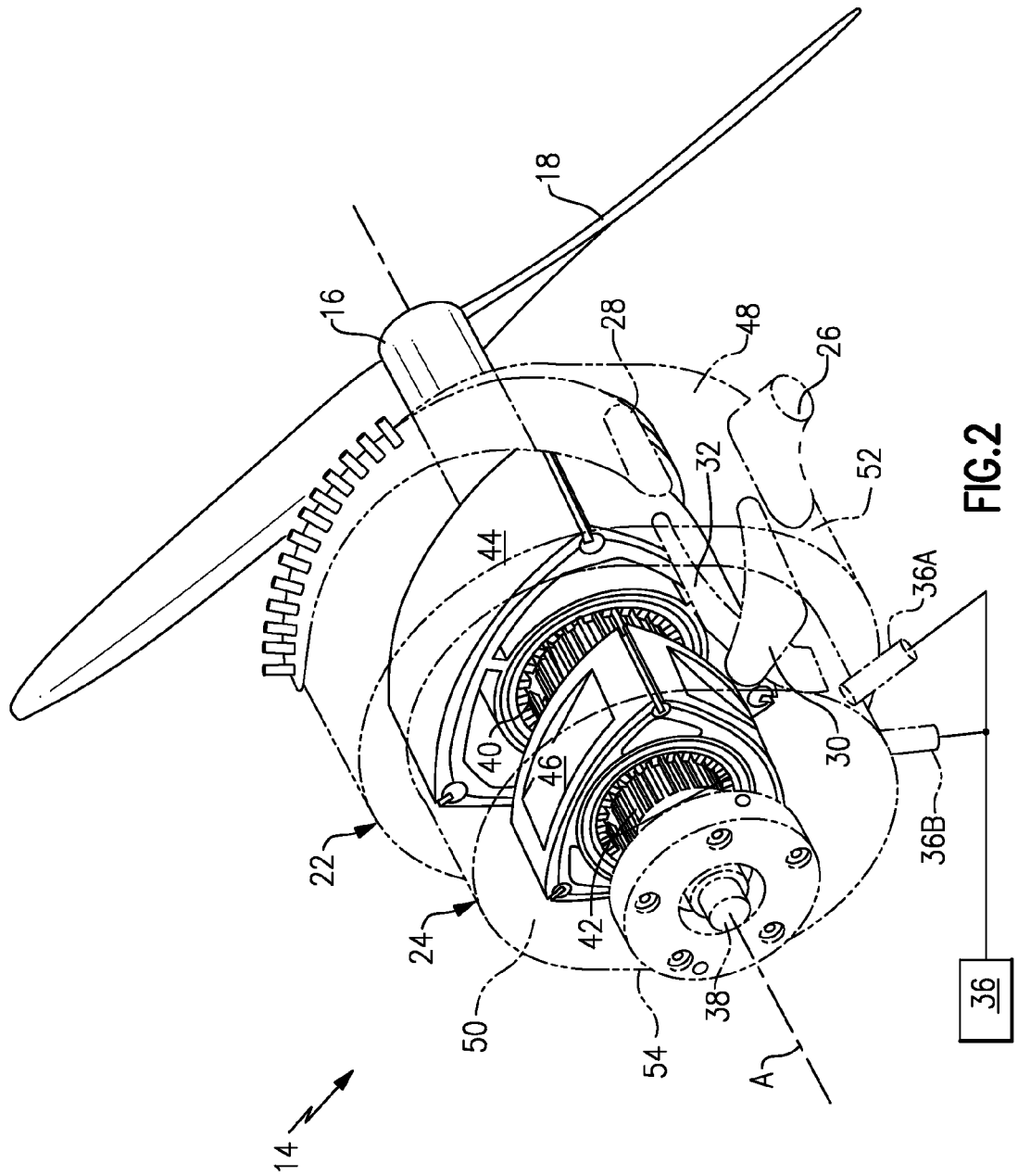
FIG. 2 is a schematic partial phantom view of an engine for use with the aircraft of FIG. 1.

With reference to FIG. 2, the engine 14 in the disclosed non-limiting embodiment is a rotary engine that includes a compression section 22 and a power section 24. Although a rotary engine is illustrated in the disclosed non-limiting embodiment, it should be understood that other engines such as gas turbine and internal combustion engines may alternatively benefit therefrom.

An intake port 26 communicates ambient air to the compression section 22 and an exhaust port 28 communicates exhaust products therefrom. A first transfer duct 30 and a second transfer duct 32 communicate between the compression section 22 and the power section 24 such that the exhaust of the power section 24 may be returned to the compression section 22 to provide power recovery and increasing efficiency which provides a cycle within what is referred to herein as a compound rotary engine of the Wankel-type that operates with a heavy fuel such as JP-8, JP-4, diesel or other.

A single shaft 38 which rotates about the axis of rotation A includes aligned eccentric cams 40, 42 which drive a respective first rotor 44 and second rotor 46 which are driven in a coordinated manner by the shaft 38. The first rotor 44 and second rotor 46 are respectively rotatable in volumes 48, 50 formed by a stationary first rotor housing 52 and a stationary second rotor housing 54. The surfaces of the volumes 48, 50 in planes normal to the axis of rotation A are substantially those of a two-lobed epitrochoid while the surfaces of the rotors 44, 46 in the same planes are generally a Reuleaux triangle which mates with the inner envelope of the two-lobed epitrochoid.

Figure 3:
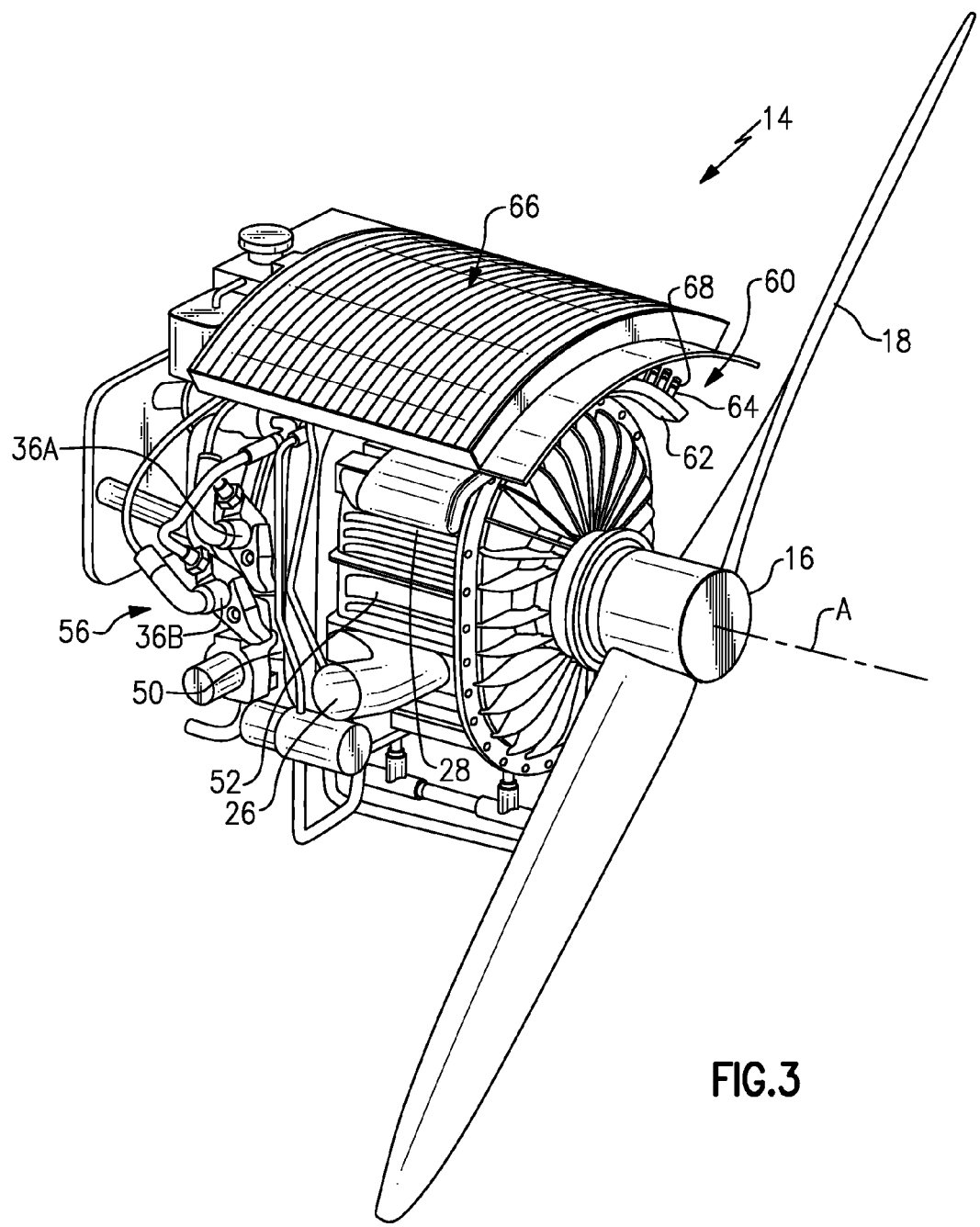
FIG. 3 is a perspective view of the engine.

A fuel system 36 includes fuel injectors 36A, 36B in communication with the second rotor volume 50 generally opposite the side thereof where the transfer ducts 30, 32 are situated in one non-limiting embodiment. The fuel system 36 supplies fuel into the second rotor volume 50. The first rotor volume 48 in one non-limiting embodiment provides a greater volume than the second rotor volume 50. The first rotor housing 52 and the second rotor housing 54 may be formed in an independent or integral manner to define an engine housing assembly 56 with various fin type and other cooling features (FIG. 3). It should be understood that various housing configurations may alternatively or additionally be provided.

In operation, air enters the engine 20 through the intake port 26. The first rotor 44 provides a first phase of compression and the first transfer duct 30 communicates the compressed air from the first rotor volume 48 to the second rotor volume 50. The second rotor 46 provides a second phase of compression, combustion and a first phase of expansion, then the second transfer duct 32 communicates the exhaust gases from the second rotor volume 50 to the first rotor volume 48. The first rotor 44 provides a second phase of expansion to the exhaust gases, and the expanded exhaust gases are expelled though the exhaust port 28. As each rotor face completes a cycle every revolution and there are two rotors with a total of six faces, the engine produces significant power within a relatively small displacement.

Figure 4:
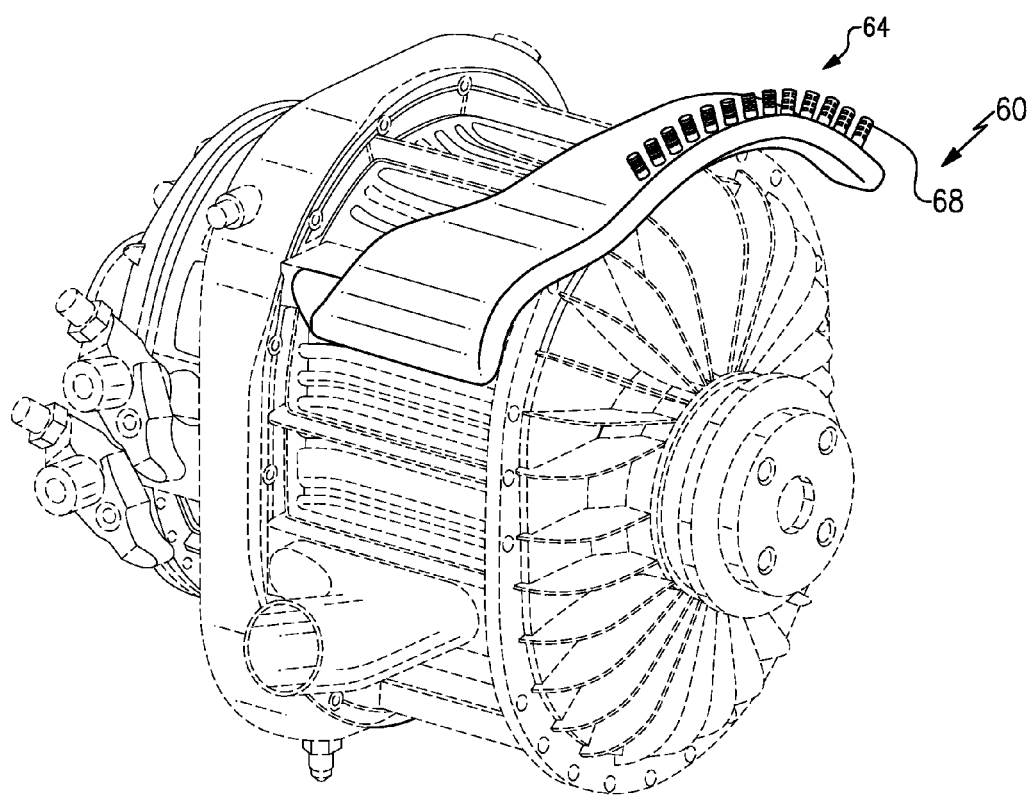
FIG. 4 is a perspective view of the engine with an exhaust system in accords with one non-limiting embodiment.

With reference to FIG. 3, an exhaust system 60 generally includes a manifold 62 and a multiple of distribution risers 64 which extend transverse thereto and include at least one downstream directed aperture 68 (FIG. 4). The exhaust system 60 may be arranged in conformal arrangement between the engine housing assembly 56 and an engine mounted conformal radiator 66. The multiple of distribution risers 64 may be arranged to receive radiator cooling air, a separate system which mixes with vehicle free stream air, or combinations thereof.

Figure 5:
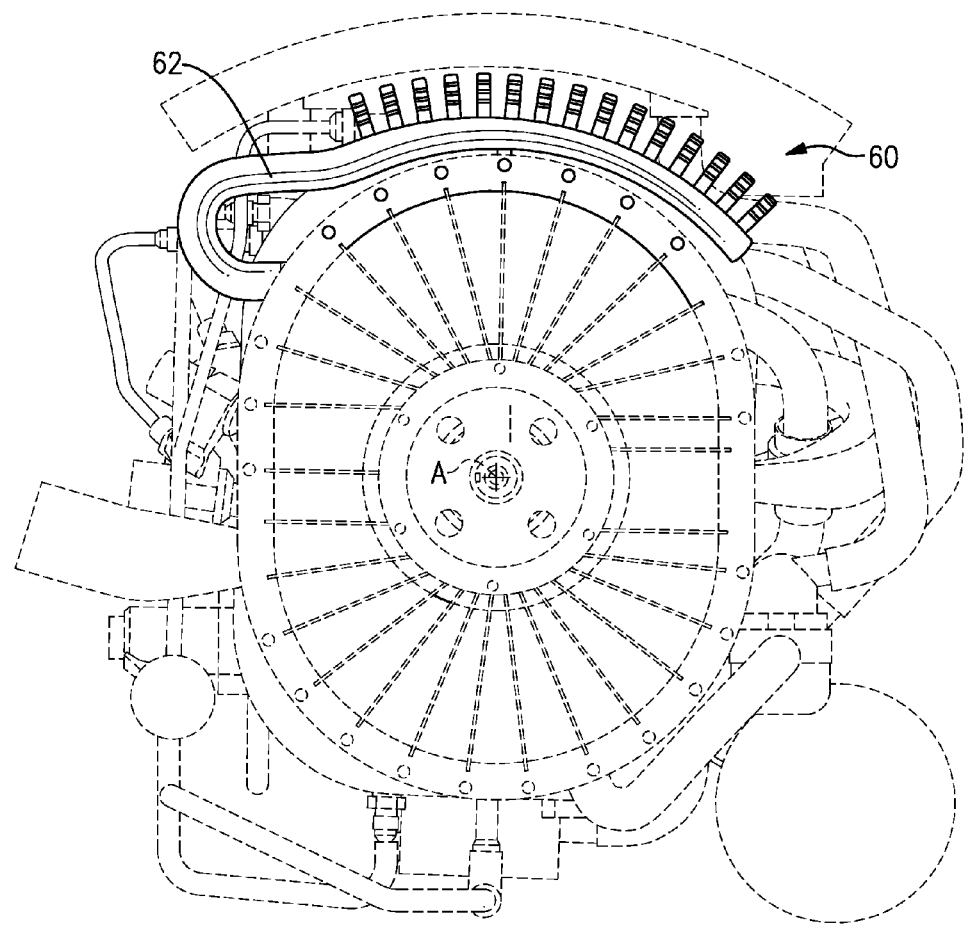
FIG. 5 is a front view of the engine illustrating the arcuate distribution of the exhaust system.

With reference to FIG. 4, the manifold 62 may be arranged to at least partially wrap around the engine housing assembly 56 to provide a compact engine package. In one disclosed non-limiting embodiment, the manifold 62 is arranged in an arc over approximately 90 degrees of a propeller sweep (FIG. 5).

Figure 6:
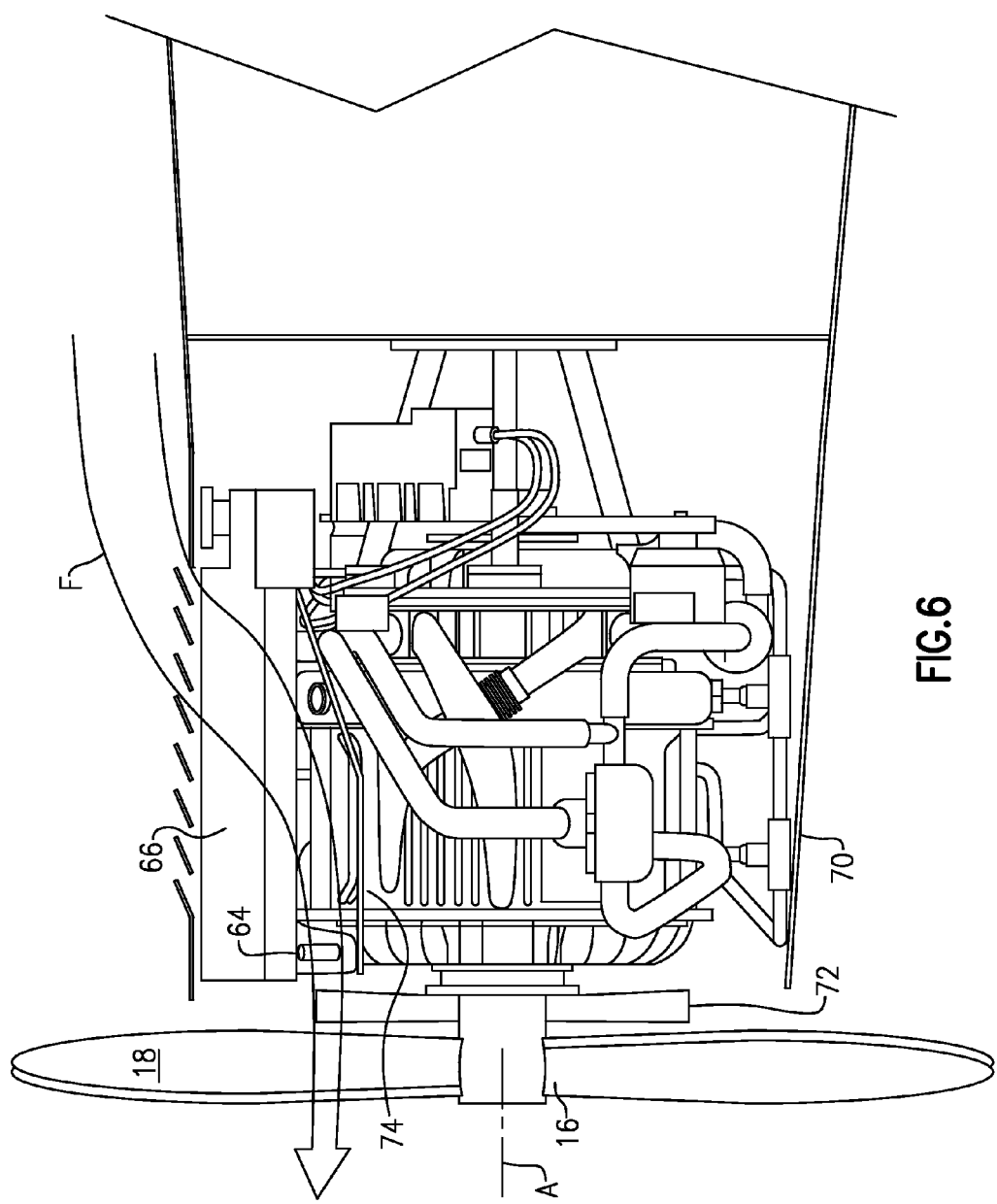
FIG. 6 is a side view of the engine mounted within a cowling of an aircraft.

With reference to FIG. 6, the free stream air flow F may be directed through an engine cowling 70 (illustrated schematically), through the conformal radiator 66, over the multiple of distribution risers 64 and out through the propeller system 16. A secondary fan 72 of a smaller diameter than the propeller system 16 may additionally be driven therewith to increase airflow through conformal radiator 66.

Various duct arrangements 74 (illustrated schematically) may further guide the airflow from the conformal radiator 66 over the exhaust system 60.

Figure 7:
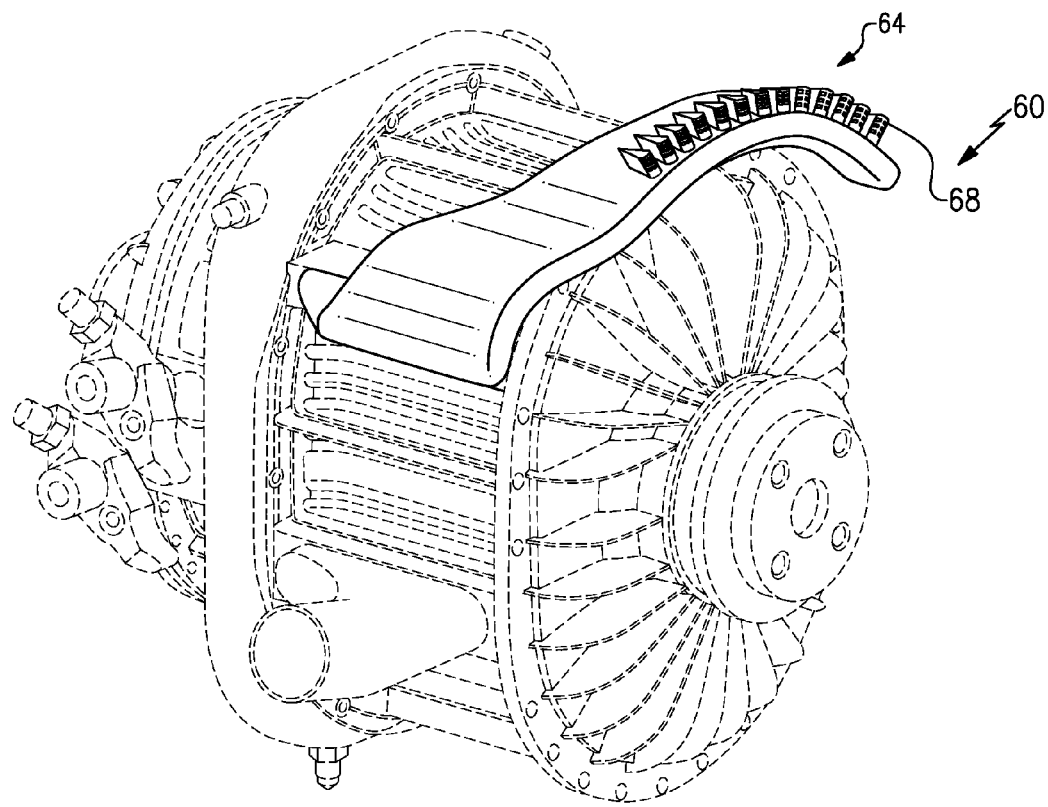
FIG. 7 is a perspective view of the engine with an exhaust system in accords with another non-limiting embodiment.
Figure 8:
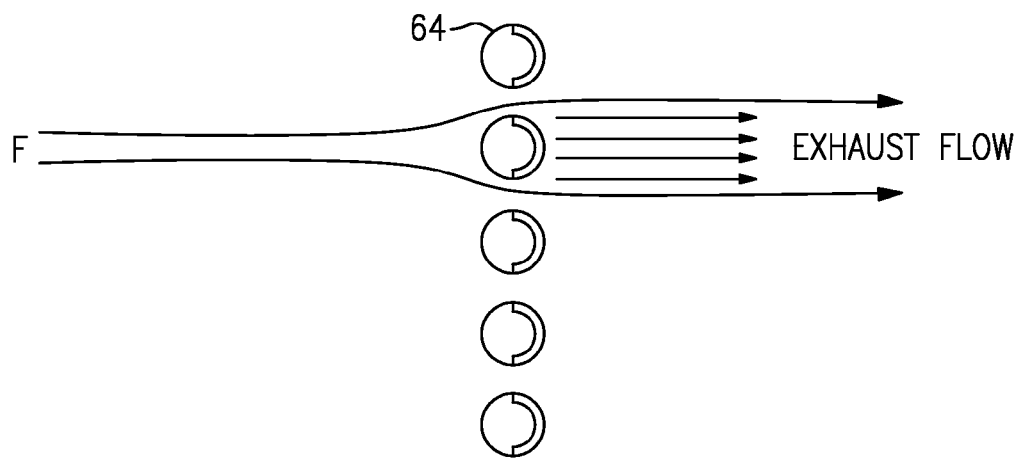
FIG. 8 is a top schematic view of the exhaust system.

Each of the multiple of distribution risers 64 may be of various shapes such as a cylindrical tube, aero-profiled element (FIG. 7) or other configuration. The multiple of apertures 68 may be formed in various shapes such as holes, slots, mesh, perforated plates or combinations thereof. In one disclosed non limiting embodiment, the multiple of apertures 68 each extend approximately 180 degrees around an aft section of each of the multiple of distribution risers 64 to distribute the exhaust flow therefrom in both an axial and a transverse direction with respect to a free stream air flow F (FIG. 8). The multiple of apertures 68 provide a large total flow area in a highly distributed manner relative to air flow for rapid mixing.

The exhaust system 60 defines a self-pumping exhaust diffuser that facilitates rapid exhaust mix-out in a short distance as the exhaust is distributed transverse to the airflow to increase airflow across the effective exhaust stream which further reduces the thermal and acoustic signature of the engine exhaust. The small ejected gas jets from the multiple of apertures 68 are quickly mixed with the air to reduce the exhaust temperatures prior to interaction with the propeller system 16. The distributed arrangement of the multiple of distribution risers 64 also ejects the exhaust gas over an area which fills a base drag area aft of the exhaust system 60 which increases propulsion efficiency.

Figure 9:
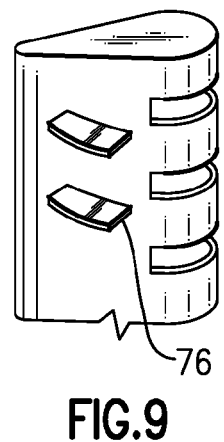
FIG. 9 is a side view of another non-limiting embodiment of a multiple of distribution risers illustrating the discrete flow injection slots.

In another disclosed, non-limiting embodiment, the distribution risers 64 may include a vortex mixing feature 76 (FIG. 9). The vortex mixing feature 76 may include strakes, dimples, or other features which are arranged transverse to the distribution risers 64 to further facilitates mixing.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An exhaust system comprising:
a manifold including an arcuate shape, said arcuate shape having a radially outer wall, a radially inner wall, an upstream portion, a downstream portion, a first circumferential end, and a second circumferential end, wherein said radially inner wall and said radially outer wall at least partially define a cavity and said radially inner wall is in register with said radially outer wall to define said arcuate shape beginning at said first circumferential end and extending towards said second circumferential end; and
a multiple of distribution risers extending transversely from said radially outer wall of said manifold, each of said multiple of distribution risers are circumferentially spaced from an adjacent distribution riser and includes at least one downstream directed aperture directed toward said downstream portion, wherein each of said multiple of distribution risers includes a multiple of downstream directed apertures.

2. The exhaust system as recited in claim 1, wherein each of said multiple of downstream directed apertures defines an approximately 180 degree arc around a perimeter of each of said multiple of distribution risers.

3. The exhaust system as recited in claim 1, wherein each of said multiple of distribution risers are tubular.

4. The exhaust system as recited in claim 1, wherein said manifold extends over an approximately 90 degree arc and said multiple of distribution risers are arranged on said manifold along said approximately 90 degree arc.

5. The exhaust system as recited in claim 1, wherein said at least one downstream directed aperture defines an approximately 180 degree arc around a perimeter of each of said multiple of distribution risers.

6. The exhaust system as recited in claim 1, wherein each of said multiple of distribution risers are arranged transverse to an airflow.

7. The exhaust system as recited in claim 1, wherein said manifold is located radially inward relative to an axis of rotation of a propeller from a radiator and said radially outer wall of said manifold is circumferentially aligned with said radiator.

8. The exhaust system as recited in claim 1, wherein a distal end of said multiple of distribution risers is sealed from fluid flow.

9. An engine comprising:
a manifold including an arcuate shape having a radially outer surface, wherein said arcuate shape extends from a first circumferential end towards a second circumferential end and defines a cavity there between; and
an exhaust system including a multiple of distribution risers extending transversely from said radially outer surface of said manifold, each of said multiple of distribution risers includes at least one downstream directed aperture directed toward a downstream portion, wherein said multiple of distribution risers are oriented in series extending in a direction from said first circumferential end towards side second circumferential end and said engine is a Wankel rotary engine.

10. The engine as recited in claim 9, wherein said manifold extends over an approximately 90 degree arc and said multiple of distribution risers are arranged on said manifold along said approximately 90 degree arc.

11. The engine as recited in claim 9, wherein said at least one downstream directed aperture defines an approximately 180 degree arc around a perimeter of each of said multiple of distribution risers.

12. The engine as recited in claim 9, wherein said multiple of distribution risers are configured to be located downstream of an engine mounted radiator and upstream of a propeller.

13. The engine as recited in claim 9, wherein said manifold is located radially inward relative to an axis of rotation of a propeller from an engine cowl, said engine cowl completely encircling an axis of rotation of said engine.

14. The engine of claim 9, wherein said arcuate shape includes a radially outer wall, a radially inner wall, said first circumferential end, and said second circumferential end, wherein said radially inner wall and said radially outer wall at least partially define said cavity and said radially inner wall is in register with said radially outer wall to define said arcuate shape.

15. A pusher prop propulsion system comprising:
an engine defined along an axis of rotation of a propeller, wherein said engine is a pusher prop propulsion engine;
a manifold including an arcuate shape having a radially outer surface to receive cooling air of said engine, wherein the arcuate shape extends in a radial direction about said axis of rotation of said propeller; and
a multiple of distribution risers extending transversely from said radially outer surface of said manifold, each of said multiple of distribution risers includes at least one downstream directed aperture, wherein said multiple of distribution risers are located upstream of said propeller.

16. The pusher prop propulsion system as recited in claim 15, wherein said engine is a Wankel rotary engine.

17. The pusher prop propulsion system as recited in claim 15, further comprising an engine mounted radiator, said multiple of distribution risers adjacent to said radiator.

18. The pusher prop propulsion system as recited in claim 17, wherein said engine mounted radiator is located radially outward from said manifold relative to said axis and is circumferentially aligned with said manifold.

19. The pusher prop propulsion system as recited in claim 15, further comprising a fan on an upstream side of said propeller adjacent said manifold.

20. The pusher prop propulsion system as recited in claim 15, wherein said manifold extends over an approximately 90 degree arc and said multiple of distribution risers are arranged on said manifold along said approximately 90 degree arc.

21. The pusher prop propulsion system as recited in claim 15, wherein said multiple of distribution risers extend in a generally radial direction relative to said axis of rotation.

22. The pusher prop propulsion system as recited in claim 15, wherein said propeller is configured to provide propulsion to an aircraft.

* * * * *